Jan. 22, 1963  G. E. BROWN  3,074,448
METHOD FOR END-GLUING WOOD MEMBERS
Filed June 9, 1960
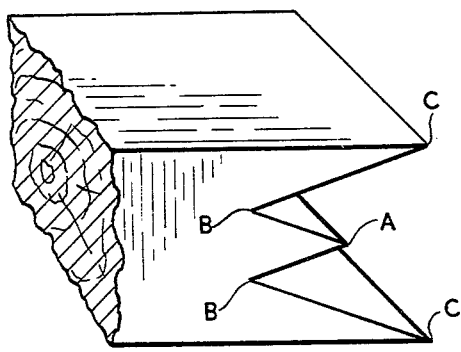
FIG. I
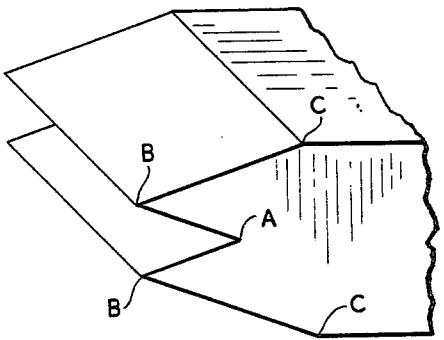
FIG. II
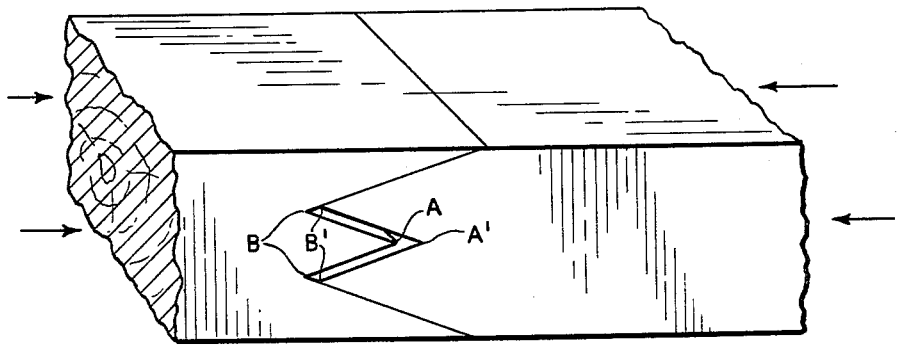
FIG. III
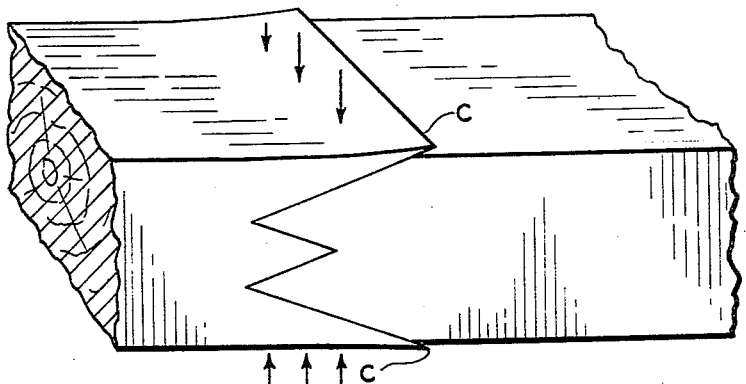
FIG. IV
GORDON E. BROWN  INVENTOR.
BY *Arthur E. Hoffman*
AGENT.

United States Patent Office 3,074,448
Patented Jan. 22, 1963

3,074,448
METHOD FOR END-GLUING WOOD MEMBERS
Gordon E. Brown, Seattle, Wash., assignor to Monsanto Chemical Company, St. Louis, Mo., a corporation of Delaware
Filed June 9, 1960, Ser. No. 34,979
5 Claims. (Cl. 144—316)

This invention relates to a method for end-gluing wood members. More particularly, this invention relates to a method of producing a structurally efficient glued end-joint in lumber, plywood, and like materials by using a novel end-joint design that is self-positioning and automatically over-registering.

In the manufacture of end-jointed plywood or end-jointed lumber for structural performance, a scarfed joint having a slope of 8:1 to 12:1 ratio is used. The machined wood gluing surface must have a high ratio of longitudinal dimension to lateral dimension in order that the joint develop a substantial percentage of the strength of the constituent members joined. Moreover, the joining surfaces must be positioned with great care when assembling the joint. It is usually contrived to overregister the surfaces a certain amount to assure that the gluing surfaces receive adequate pressure and that the pressure applied can not be relieved by the part of the member adjacent the joint. Heat is usually used to cure the adhesive rapidly while the assembly is mechanically constrained under pressure.

Variations of the scarf joint include the so called hook scarf or step scarf, a configuration of the machined area to help alignment in assembling, and the use of wood pegs through the joints to position the two members with respect to each other. These devices reduce the effective cross sectional area and hence reduce strength.

End-joints formed by interlocking fingers machined into the ends of the wooden members are widely used on lumber where it is unnecessary to attain tensile strength and modulus of rupture approaching that of solid unjointed material. Finger joints are not considered to be of structural quality by the building trade.

One object of this invention is to provide an end-jointed article having a substantial percentage of the tensile strength of the solid material joined.

Another object is to provide a method of end-jointing which is self-positioning and which will permit mechanical handling, glue spreading, assembling and gluing.

Another object is to provide an end-joint design which is center-aligning and overregistering so that subsequent planing of the glued assembly will waste a minimum of the material.

These and other objects are attained by uniting under first end pressure, then side pressure the ends of two members, each of which has been machined to a specific shape. The configuration of the machined surfaces is critical to this invention and to the advantages of this method. The mating surfaces are machined so that end pressure will close the joint to produce a mechanically precise degree of overregister on a major portion of the joint.

In the accompanying drawings FIGURE I is a fragmentary perspective view showing an end portion of one piece used in forming this end-joint.

FIG. II is a fragmentary perspective view showing an end portion of another piece shaped to mate with the piece shown in FIG. I.

FIG. III is a fragmentary perspective view showing two end pieces telescoped together into light contact with each other.

FIG. IV is a fragmentary perspective view showing said two end pieces pressed together firmly by end pressure into intimate contact and with parts thereof in over-registering relation.

Like reference characters refer to like parts throughout the drawings.

The drawings just described illustrate how this invention is accomplished. The members to be joined are shown in perspective, the top representing the broad surface of each member. The surfaces BC, BA, B'C', and B'A', are machined to form planes each parallel to the width axis of the member. Before assembling, the surfaces BC, BA, B'C', and B'A', are coated with adhesive and are hence called gluing surfaces. As the assembly is positioned with contact pressure, FIG. III, the surfaces BC, contact surfaces B'C', but the surfaces BA are still a definite distance from surfaces B'A'. It will be seen that this distance is controllable and can vary according to the shape of the machining device or cutterhead. End pressure forcing the two members together causes surfaces BA and B'A' to come together in intimate contact while surfaces BC will overregister surfaces B'C', FIG. IV. Applied side pressure on the broad surface will now transmit effectively to all of joint surfaces BC and B'C' and to that portion of the surfaces BA and B'A' near the relatively flexible tips B'.

The following example is given by way of illustration and is not intended as any limitation on the scope of this invention.

EXAMPLE I

Two sections of ordinary 2 x 4 lumber were cut in the manner of the illustration herein. The female section FIG. I, was cut so that the two primary gluing surfaces BC were each at an angle of twelve degrees to the intersecting broad surface of the member and the slope was approximately 5 to 1. The cut extended to a point one half inch from the same broad surface intersected, so that the longitudinal dimension of the cut was two and one half inches. Two secondary gluing surfaces BA were cut, each parallel to one of the primary surfaces and intersecting the other primary surface at the aforementioned point one half inch from the broad surface. The surfaces described are in symmetrical relation. The male member, FIG. II, was cut so that the primary gluing surfaces B'C' were each at an angle of one hundred sixty-eight degrees to the remaining original broad surface. Two secondary gluing surfaces A'B' were cut, each parallel to a primary surface B'C' and each intersecting and truncating the other primary surface so that primary surfaces B'C' were limited in longitudinal dimensions to two and five sixteenths inches. The gluing surfaces were spread with a layer of adhesive, Monsanto MF304 melamine-formaldehyde glue, and the two sections were assembled. End pressure of two hundred fifty pounds per square inch on the cross-sectional area was applied as indicated by the arrows in FIG. III. The assembly was then pressed ten minutes with two hundred fifty pounds per square inch applied to the broad surfaces, as indicated by the arrows in FIG. IV, by means of metal platens heated to three hundred degrees Fahrenheit. The assembly was now a firmly united integral unit. Tensile strength tests rupturing the area including the joint showed no rupture along the glueline. Tensile rupture strength of the area including the glueline was 5990 pounds per square inch cross-sectional area, whereas the tensile strength of the weaker of the two constituent sections, measured in solid wood, was 6130 pounds per square inch.

My method has a number of distinctions and advantages over ordinary prior art methods of end-jointing wood. Ordinary straight slope scarf joints glued with some overregister represent the highest tensile strength commercial joints heretofore known. However, it is only under idealized conditions, such as could be obtained in a laboratory, that percentile strengths, referred to solid material, exceed 80% with any consistency. Under conditions of normal production, 50% to 70% is seldom exceeded, largely because of the difficulty in obtaining a uniform and proper amount of overregister. Hooks, pegs and other positioning aids reduce the effective cross-section and hence the tensile strength. Another favorable distinction of my invention over the straight scarf is the saving of a large portion of the loss of length dimension in machining. Another distinction is evident from the fact that a scarf joint cannot be overregistered without misaligning the joined members with respect to their broad surfaces. My method is differentiated from any of the variegated finger joint designs by my feature of overregistration which is abent from any of them. Further, finger joints require only end pressure to consolidate the joint; if side pressure is used it is only to align the assembly and not to transmit pressure throughout the greater part of the joint.

What I claim is:

1. In the end-jointing of elongated male and female wood members of rectangular cross-section by adhesive, the improvement which comprises cutting two primary gluing surfaces in the female member so as to be symmetrically opposite, each surface being in a plane at an angle acute to the original broad surface intersected, said intersections being perpendicular to the long axis of said member; cutting at least two secondary gluing surfaces in said member, two of which intersect each other at the center of said member and two of which each intersect the corresponding primary surface at an acute angle, all intersections of gluing surfaces being perpendicular to the long axis of said member and parallel to the broad face; cutting in the male member two primary gluing surfaces at such oblique angle as to approximately fit the female primary gluing surfaces when the axes are aligned; cutting at least two secondary gluing surfaces in the male member to parallel the respective female secondary gluing surfaces but to fall short of a contact fit by an increment of dimension between one sixteenth inch and three eighth inch measured along the long axis of the members, said secondary gluing surfaces transcribing in aggregate between one-twentieth and one-half the total cross section of the member; and in the assembling thereof first applying adhesive to gluing surfaces, then bringing the primary gluing surfaces of the male member and the female member into contact fit, and finally applying first end-pressure along the long axis of said members to bring the secondary gluing surfaces of the male member and the female member into contact fit and applying then pressure to the broad surfaces of the assembled members to consolidate the assembly.

2. The method of claim 1 wherein the wood members are of lumber.

3. The method of claim 1 wherein the wood members are of plywood.

4. The method of claim 1 wherein the wood members are of wood particle board.

5. The end-jointed article of claim 1.

References Cited in the file of this patent

UNITED STATES PATENTS

| | | |
|---|---|---|
| 1,947,395 | Hutchings | Feb. 13, 1934 |
| 2,198,245 | Goss et al. | Apr. 23, 1940 |

FOREIGN PATENTS

| | | |
|---|---|---|
| 758,976 | France | Nov. 7, 1933 |
| 670,408 | France | Aug. 19, 1929 |
| 778,528 | France | Dec. 22, 1934 |